United States Patent [19]

Tsuji et al.

[11] Patent Number: 4,635,290

[45] Date of Patent: Jan. 6, 1987

[54] SECTIONING APPARATUS AND METHOD FOR OPTICAL CHARACTER READER SYSTEMS

[75] Inventors: Yoshitake Tsuji; Ko Asai, both of Tokyo, Japan

[73] Assignee: NEC Corporation, Tokyo, Japan

[21] Appl. No.: 683,576

[22] Filed: Dec. 19, 1984

[30] Foreign Application Priority Data

Dec. 20, 1983 [JP] Japan ............................ 58-240335
Feb. 7, 1984 [JP] Japan ............................ 59-20299
Feb. 7, 1984 [JP] Japan ............................ 59-20300

[51] Int. Cl.$^4$ .......................................... G06K 9/34
[52] U.S. Cl. .......................................... 382/9; 382/48
[58] Field of Search .................................. 382/9, 48

[56] References Cited

U.S. PATENT DOCUMENTS

| | | | |
|---|---|---|---|
| 3,111,646 | 11/1963 | Harman .................... | 382/9 |
| 3,629,826 | 12/1971 | Cutaia et al. . | |
| 4,365,234 | 12/1982 | Henrichan, Jr. ........... | 382/9 |
| 4,377,803 | 3/1983 | Lotspiech ................. | 382/9 |
| 4,466,121 | 8/1984 | Damen et al. ............. | 382/9 |
| 4,481,665 | 11/1984 | Ota .......................... | 382/9 |
| 4,558,461 | 12/1985 | Schlang ................... | 382/9 |

FOREIGN PATENT DOCUMENTS 53-27333  3/1978  Japan ....................... 382/9

Primary Examiner—Howard A. Birmiel
Attorney, Agent, or Firm—Schwartz, Jeffery, Schwaab, Mack, Blumenthal & Evans

[57] ABSTRACT

A character sectioning apparatus for segmenting character stream images into individual characters utilizes the projection distribution obtained through a series of character strain images. The apparatus includes means for identifying the character lumps and blank spaces from the projection distribution, means for estimating the character pitch, means responsive to the projection distribution and the character pitch for setting segmentation candidate sections each having a plurality of segmentation candidate positions, means for calculating a distance measurement between each of the segmentation candidate positions within the segmentation candidate sections and segmentation candidate positions within adjacent segmentation candidate sections, means for calculation an appreciation standard and means for selecting an optimum segmentation candidate for each of the plurality of segmentation candidate sections. The appreciation standard is selected as a function of the distance measurements for segmentation candidate positions in each of the plurality of segmentation candidate sections. Each optimum segmentation candidate position minimizes the appreciation standard for the respective segmentation candidate section.

18 Claims, 15 Drawing Figures

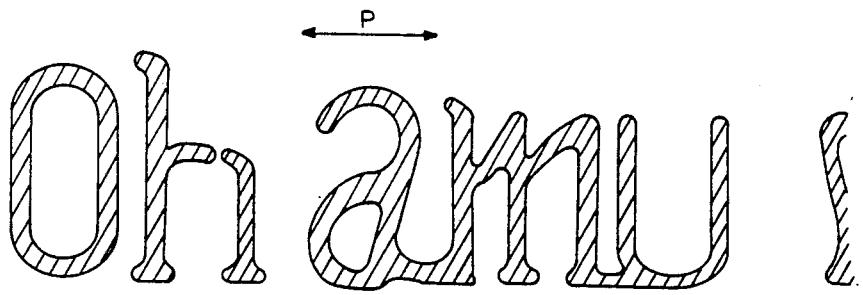
FIG. 1(a)
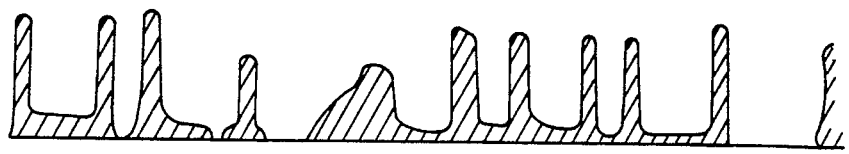
FIG. 1(b)
FIG. 1(c)
FIG. 1(d)
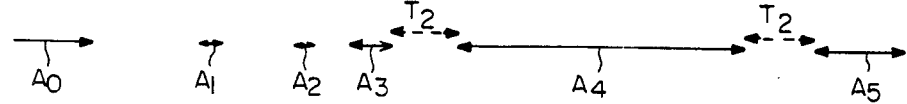
FIG. 1(e)
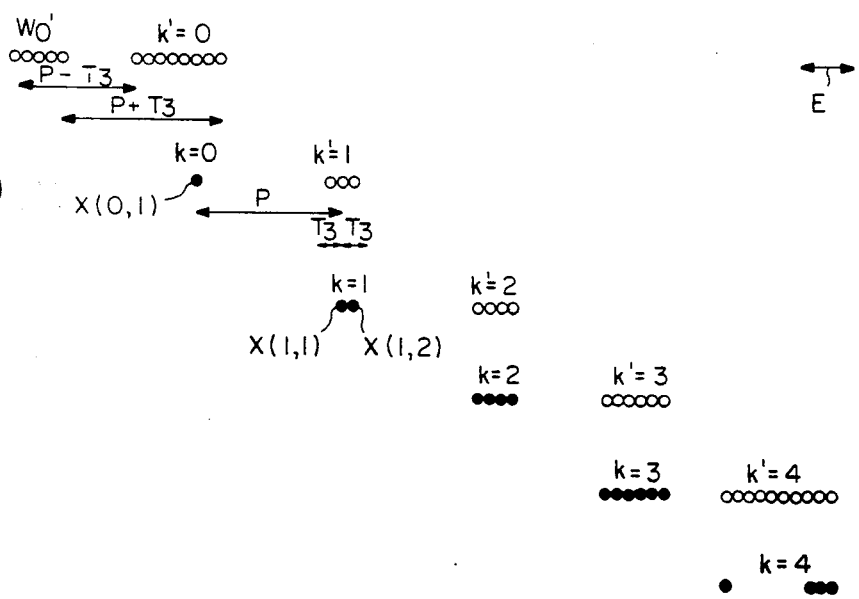
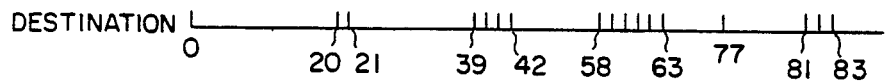

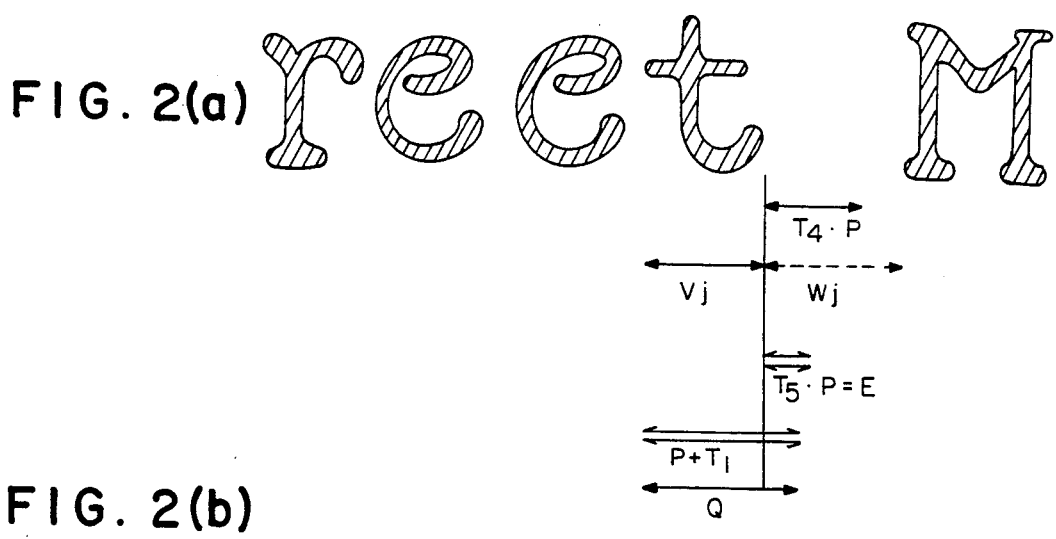
FIG. 2(a)
FIG. 2(b)
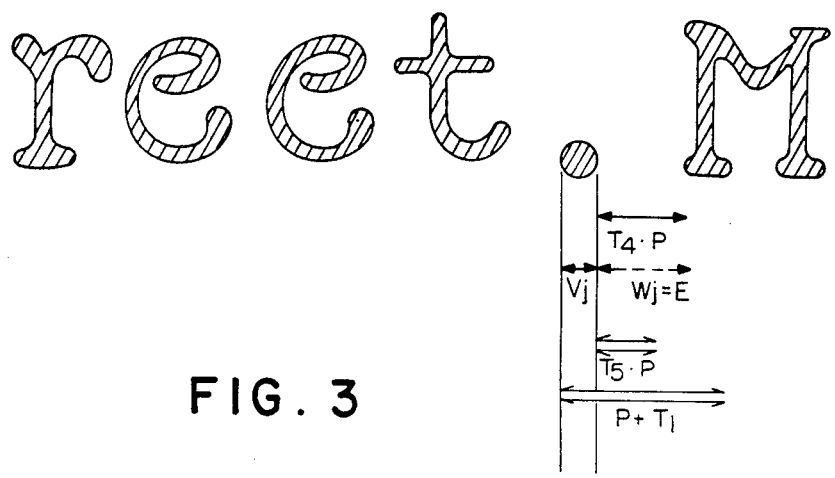
FIG. 3
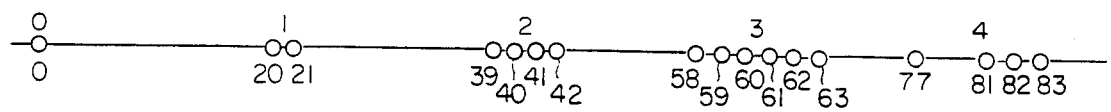
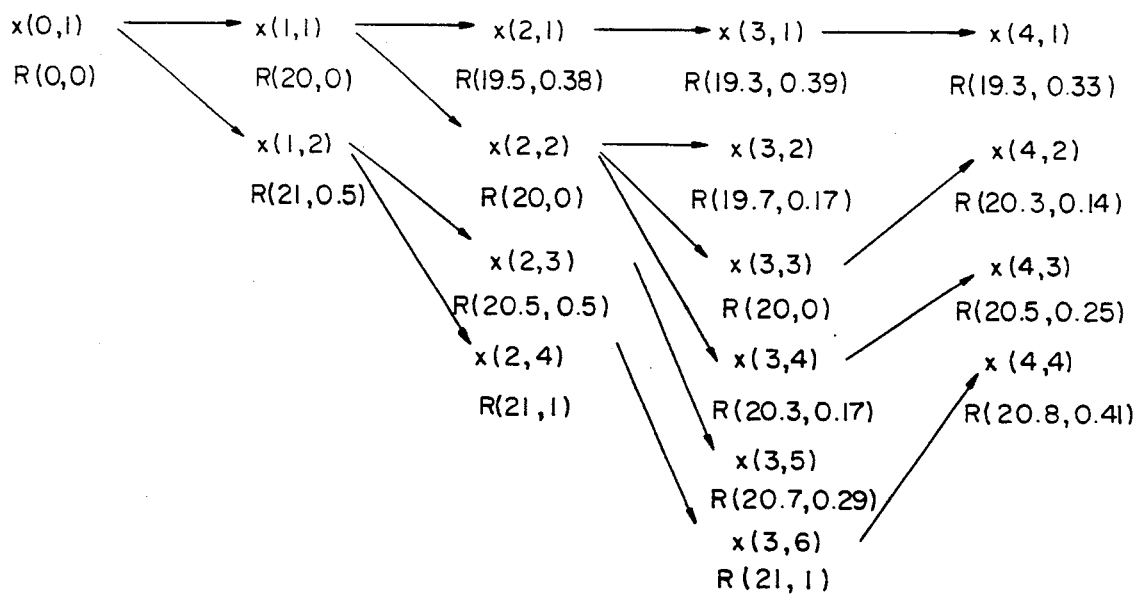

SECTIONING APPARATUS AND METHOD FOR OPTICAL CHARACTER READER SYSTEMS

BACKGROUND OF THE INVENTION

The present invention relates to optical character reader systems. More particularly, it is concerned with a sectioning apparatus for sectioning a character string image given on a paper into individual characters.

In order to recognize a series of printed characters, the optical character reader systems are required to separate the characters one by one. Further, it is desirable for the optical character reader systems to be able to manage printed characters of many font types and poor print quality which are printed on general mails and documents. In a character string printed on general documents, there is a case where the characters to be separated touch each other, or one character is separated into more than one image due to the poor print quality. Further, in the case of the alphabet, each character width varies according to a variance in the font or character category. Therefore, a sectioning apparatus is necessary, which can properly section the character string into individual characters under the above-mentioned conditions.

This type of sectioning apparatus has been proposed in U.S. Pat. No. 3,629,826. The proposed sectioning apparatus scans a character image vertically and sets a character segmentation position by detecting a position where a vertical scan bit is minimized. In order to segment the touching characters, this apparatus stores many touching images for every character in advance, and a segmentation position is determined by comparing the touching character image with the stored touching images. That is, this apparatus performs the character segmentation referring to the local images of the character string.

However, such sectioning apparatus cannot properly segment the character split into two or more images as one character. Additionally, this apparatus requires a vast memory capacity for storing many touching images of every character touching other characters. Furthermore, a special function for character segmentation in accordance with an individual case may invite a considerable deterioration in precision and speed of the character segmentation.

This type of sectioning apparatus can use a character pitch as information for segmenting a character string. The character pitch can be given to the sectioning apparatus as known information by limiting printed matter to be read by an optical character reader. However, since characters printed or written on a general document have an unspecified character pitch as described above, the character pitch cannot be known beforehand. Accordingly, the character pitch must be estimated from a character string image on the paper.

Heretofore, a mean value of character widths of various characters is used as an estimated value for the character pitch. However, in the case where an individual character width largely varies according to a font or a character category, or touching characters increase in number, an error between the mean value of character widths and an actual character pitch is no longer negligible. Due to the error, the sectioning apparatus mistakes the number of touching characters or cuts off the character string at an incorrect position for segmentation. Further, as described above, it is desirable for the optical character reader to manage both the characters printed at constant pitch and printed at variable pitch including hand-written characters. In such a case, the sectioning apparatus must change the algorithm for character segmentation according to the constant pitch-printed characters and the variable pitch-printed characters. Therefore, it is also important to identify whether the pitch of the obtained character data is constant or variable before performing segmentation of character string.

SUMMARY OF THE INVENTION

Therefore, an object of the present invention is to provide a sectioning apparatus capable of separating a character string into individual characters with precision even in the case where a character string includes touching characters, or one character is split into two or more images.

Another object of the present invention is to provide a novel sectioning method for segmenting a series of character strings into individual characters.

A further object of the present invention is to provide a sectioning apparatus capable of stably detecting an optimum character pitch even in the case where a character string includes touching characters, or one character is split into two or more images.

Still a further object of the present invention is to provide a sectioning apparatus capable of identifying whether obtained character data has a constant pitch or variable pitch, and thereby, carrying out character segmentation in accordance with a property of character pitches.

According to the present invention, there is provided a sectioning apparatus which determines a character segmenting position through setting segmentation candidate sections in sequence by means of a character pitch and a blank space information of character image, and working out a sequence of character segmentation positions in accordance with a dynamic programming. The sequence of character segmentation positions are determined so that they minimize the variance of distance between the segmentation candidate positions and the variance of dislocation between an average distance and a character pitch.

Further, according to the present invention, there is provided a sectioning apparatus estimating a character pitch. This sectioning apparatus separates the frequency distribution of a character lump on a distance between the character lumps into a plurality of sections by means of a candidate character pitch. The character lumps are separated by the blank space information of character image. The candidate character pitch is set by means of character height or other information. The sectioning apparatus works out an optimal linear form sum appreciation standard (various criterion) of the error between a representative point of the separated section and the candidate character pitch. The most appropriate character pitch is so determined so that it minimizes the optimal linear form sum appreciation standard (various criterion).

BRIEF DESCRIPTION OF THE DRAWINGS

The above-mentioned and other objects, features and advantage of the present invention will be better understood from the following detailed description of preferred embodiments of the present invention taken in conjunction with the accompanying drawings, wherein;

FIGS. 1 (a) to 1 (e) illustrate character segmentation candidate positions set on a character string image in accordance with an embodiment of the present invention.

FIGS. 2 (a) and 2 (b) illustrate trailing end positions set on the character string image in accordance with an embodiment of the present invention.

FIG. 3 illustrates a principle for extracting optimal character segmentation positions from a plurality of character segmentation candidate positions.

DESCRIPTION DETAILED OF THE PREFERRED EMBODIMENTS

Figure 5:
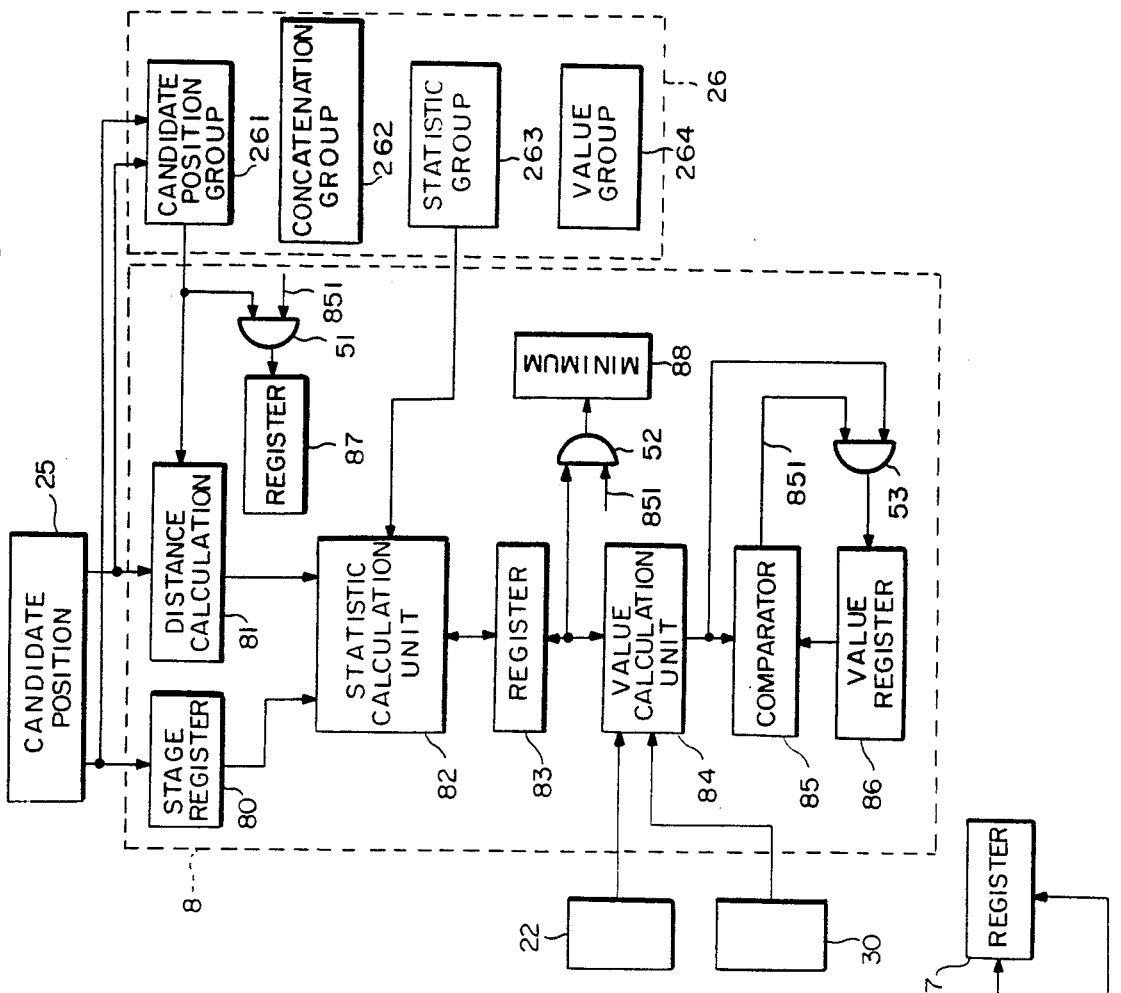
FIG. 5 is a block diagram of the appreciation standard arithmetic operation unit shown in FIG. 4.

FIG. 1 (a) shows a character string image including touching characters and one character split into two images in oblique lines. A character pitch P may be obtained by a character pitch detector described hereinafter, but if it is known already, then the known value can be used. A projection distribution shown in FIG. 1 (b) is obtained through projecting vertically the character string image of FIG. 1 (a).

In order to separate the touching characters (a m u) and the split character (h) into a correct unit of individual character, a segmenting start position of the character must be predicted correctly. For example, in the touching character images "a" and "m", "a" is slightly smaller. Therefore, the segmenting start position should be set slightly leftward from a leading end of the touching character images (a m u).

Positions and sizes of a white area (hereinafter called a blank space) and a black area (hereinafter called a character lump) are extracted from the projection distribution shown in FIG. 1 (b). A plurality of character lump width $V_i$ (i=1, ... 4), blank space $W_i$ (i=0, ... 4) and position information thereof are obtained from the projection distribution, as shown in FIG. 1 (c).

Next, sections for setting the character segmentation positions (hereinafter called permissible sections) are set by means of the character pitch P and preset thresholds $T_1$ and $T_2$ under the following conditions (1) and (2).

Condition (1): A section of the blank spaces is set as a permissible section.

Condition (2): A portion of a section of character lumps whose width $V_i$ satisfies $V_i > P + T_1$, is set as a permissible section. The portion is defined by truncating $V_i$ by an amount $T_2$ at both ends. The remaining (truncated) character lump is the permissible section.

The permissible section satisfying the above conditions (1) and (2) comes in, as shown in FIG. 1 (d), sections $A_0$, $A_1$, $A_2$, $A_3$, $A_4$ and $A_5$. Here, the above thresholds $T_1$ and $T_2$ may be given as functions of the character pitch P. Moreover, the threshold $T_1$ may be set according to an estimate error arising from estimating the character pitch P as described later.

Next, segmentation candidate sections k (k≧0) shown in FIG. 1 (e) are set within the permissible sections $A_1$, $A_2$, $A_3$, $A_4$ and $A_5$ by using the character pitch P and preset threshold $T_3$. Referring to FIG. 1 (e), first scan bits $W_0'$ (indicated by white dots) are set in the blank space $A_0$. Next, a section k'=0 in which a distance from the arbitrary scan bit $W_0'$ satisfies $(P \pm T_3)$ is set. Next, the section including both the permissible section $A_1$ and the section k'=0 is set as the segmentation candidate section k=0.

In the example shown, only one scan bit of section k'=0 lies within permissible section $A_1$. Therefore, only one scan bit (indicated by a blank dot) exists in the first segmentation candidate section k=0. The scan bit indicated by a black dot is called a segmentation candidate position hereinafter, which is expressed as $x(k, i_k)$. Here, $i_k$ is an integer starting from 1, which is a relative number in the segmentation candidate section k. That is, the first segmentation candidate position x(0, 1) is detected in this stage.

Next, a section k'=1 is defined such that the distance between segmentation candidate position x(0, 1) and section k'=1 is within $(P \pm T_3)$. The scan bits of section k'=1 which lie within section $A_3$ define the segmentation candidate section k=1. The segmentation candidate section k=1 includes two segmentation candidate positions x(1, 1) and x(1, 2). Then, the section in which the distance from a segmentation candidate position x(1, $i_1$) is $(P \pm T_3)$, namely, the section from x(1, 1)+P−$T_3$ to x(1, 2)+P+$T_3$ is set as a section k'=2. All of section k'=2 is included in the permissible section $A_4$, therefore, the segmentation candidate section k=2 is identical with the section k'=2. The segmentation candidate section k=2 includes four segmentation candidate positions x(2, 1), x(2, 2), x(2, 3) and x(2, 4).

A section k'=3 is then set according to the segmentation candidate section k=2 as described above, and a segmentation candidate section k=3 with segmentation candidate position x(3, $i_3$) ($i_3$=1, 2, 3, 4, 5, 6) are set by a logical product with the permissible section $A_4$. A segmentation candidate section k=4 and a segmentation candidate position x(4, $i_4$) ($i_4$=1, 2, 3, 4) are set according to the segmentation candidate section k=3. Then, a segmentation candidate position x(4, 1) is created by a logical product of a section k'=4 and the permissible section $A_4$, and positions x(4, 2) x(4, 3) and x(4, 4) are created by a logical product of the section k'=4 and the permissible section $A_5$.

As will be apparent from the above description, if the distance $\{x(k+1, i_{k+1}) - x(k, i_k)\}$ between segmentation candidate positions $x(k, i_k)$ and $x(k+1, i_{k+1})$ be expressed as $d(k, k+1; i_k, i_{k+1})$, all the segmentation candidate positions $x(k, i_k)$ and $x(k+1, i_{k+1})$ within the adjacent segmentation candidate sections k and k+1 will satisfy the following formula:

$$|d(k, k+1; i_k, i_{k+1}) - P| \leq T_3 \tag{1}$$

For example, the distance between the segmentation candidate positions x(1, 1) and x(2, 2) satisfies the following formula:

$$|d(1, 2; 1, 2) - P| \leq T_3$$

In other words, the position satisfying the formula (1) with respect to the segmentation candidate position x(0, 1) are three points as indicated by white dots (the section k'=1 of FIG. 1 (e)). However, in these white dots, the white dots existing within the permissible section $A_3$ are two, and a segmentation candidate position $x(1, i_k)$ has two positions $x(1, 1)$ and $x(1, 2)$.

Here, the above-described threshold $T_3$ can be given as a function of the character pitch P like the threshold $T_1$. Further, the segmentation candidate section k can also be set under another condition by means of the character pitch P, the character lump width Vi, and the blank space Wi.

A method for detecting a trailing end of the character string image will be described hereinafter. As will be described later, the trail end detection is necessary for determining a segmentation position of the character string.

Referring to FIGS. 2 (a) and 2 (b), the character image is disintegrated into the character lumps Vi and blank spaces Wi. Each blank space Wi is compared with the product $T_4 \cdot P$, i.e., the product of a preset parameter $T_4$ and the character pitch P. If a blank space $W_i$ contains a section $W_j$ greater than the product $T_4 \cdot P$, this section is set as a first trailing end candidate section.

Next, the product $T_5 \cdot P$, i.e., the product of a preset parameter $T_5$ ($T_5 \leq T_4$) and the character pitch P is calculated. The section from a leading end of trailing end candidate section $W_j$ to the position determined by the product $T_5 \cdot P$ is set as a first trailing end permissible section. Next, the section extending from a leading end of a character lump $V_j$ (present immediately before the candidate section $W_j$) to the position determined by the sum $P+T_1$ (the sum of the character pitch P and the parameter $T_1$) is set as a second trailing end permissible section. Further, a logical sum of the first and second trailing end permissible sections $T_5 \cdot P$ and $P+T_1$ is set as a second trailing end candidate section Q.

A trailing end section E is determined by working out the logical product of the first candidate section $W_j$ and the second candidate section Q. That is, in FIG. 2 (a), the trailing end section E is equal to the section $T_5 \cdot P$, and in FIG. 2 (b), the trailing end section E is equal to the section $W_j$. A trailing end section E of the character image shown in FIG. 1 (a), which is obtained through the similar method, becomes the section indicated by an arrow E shown in FIG. 1 (e). The trailing end section E of the FIG. 1 (e) includes the segmentation candidate positions $x(4, 2)$, $x(4, 3)$ and $x(4, 4)$.

The trailing end section can be set in various ways. For example, the blank space of a trailing end of the character line may be set as a trailing end section. Further, when a segmentation candidate section $(k+1)$ is set by using the segmentation candidate section k, and the segmentation candidate position $x(k+1, i_{k+1})$ satisfying the formula (1) is not in a permissible section $A_i$, then the segmentation candidate section k may be set as the trailing end section. On the other hand, the leading end of the segmentation candidate section can be set according to the position of the trailing end section which has already been detected.

Next, a process for determining the character segmenting position will be described hereinafter. In FIG. 3, positions indicated by a black dot represent each segmentation candidate position $x(k, i_k)$ shown in FIG. 1 (e) with the scan pitch equal to 1 and the position $x(0, 1)$ working as an origin. The character pitch P is set at "20". Further, for simplicity of describing a principle of the character segmentation, the character string image for segmentation shall extend from segmentation candidate section $k=0$ to segmentation candidate section $k=4$ as shown in FIG. 1 (e).

First, symbols to be used for the description will be defined: A symbol $\mu_d(r, n; i_r, i_n)$ ($0 \leq r < n$) denotes a mean value of $(n-r)$ pieces of distances $d(r, r+1; i_r, i_{r+1})$, $d(r+1, r+2; i_{r+1}, i_{r+2})$, ..., $d(n-1, n; i_{n-1}, i_n)$ obtained through $(n-r+1)$ pieces of segmentation candidate positions $x(r, i_r)$, $x(r+1, i_{r+1})$, ..., $x(n, i_n)$. The positions $x(r, i_r)$, $x(r+1, i_{r+1})$, ..., $x(n, i_n)$ are selected arbitrarily in each segmentation candidate section from $k=r$ to $k=n$. A symbol $\sigma_d^2(r, n; i_r, i_n)$ ($0 \leq r < n$) denotes a variance in the mean value $\mu_d(r, n; i_r, i_n)$ of $(n-r)$ pieces of distances $d(r, r+1; i_r, i_{r+1})$, $d(r+1, r+2, i_{r+1}, i_{r+2})$, ... $d(n-1, n; i_{n-1}, i_n)$.

Character segmenting positions extending from the segmentation candidate section r ($r=0$ in FIG. 3) (leading end) to the segmentation candidate section n ($n=4$ in FIG. 3) (trailing end) are obtained by determining the segmentation candidate positions $x(r, i_r)$, $x(r+1, i_{r+1})$, ..., $x(n, i_n)$ which minimize an appreciation standard U indicated by the following formula:

$$U(r, n) = \beta \cdot \sigma_d^2(r, n; i_r, i_n) + (1-\beta) \cdot (\mu_d(r, n; i_r, i_n) - P)^2 \quad (2)$$

The weighting factor $\beta$ in the formula (2) satisfies $0 \leq \beta \leq 1$.

The segmentation candidate position for minimizing the formula (2) can be determined according to the following dynamic programming. An optimum segmentation candidate position $x(k, i_k)$ in the segmentation candidate section k is obtained according to the following recurrence formulas (3-1), (3-2) and (3-3). Arbitrary segmentation candidate positions $x(k, i_k)$ ($i_k=1, 2, \ldots h_k$) and segmentation candidate positions $x(k+1, i_{k+1})$ ($i_{k+1}=1,2, \ldots h_{k+1}$) are used in these formulas. That is, a distance $d(k, k+1; i_k, i_{k+1})$ is calculated first, and then the following formulas (3-1), (3-2) and (3-3) are calculated.

$$\mu_d(0, k+1; i_0, i_{k+1}) = \frac{1}{k+1} \{k \cdot \mu_d^*(0, k; i_0, i_k) + d(k, k+1; i_k, i_{k+1})\} \quad (3-1)$$

$$D(k+1) = D^*(k) + d^2(k, k+1; i_k, i_{k+1}) \quad (3-2)$$

$$U(0, k+1) = \beta \cdot \left( \frac{D(k+1)}{k+1} - \mu_d^2(0, k+1; i_0, i_{k+1}) \right) + (1-\beta)(\mu_d(0, k+1; i_0, i_{k+1}) - p)^2 \quad (3-3)$$

The segmentation candidate position $x^*(k, i_k)$ minimizing the appreciation standard $U(0, k+1)$ of the formula (3-3) becomes an optimum segmentation candidate position of the segmentation candidate section $(k+1)$ having $h_k$ values of segmentation candidate positions $x(k, 1), \ldots x(k, h_k)$ of the segmentation candidate section k.

Here, with reference to each segmentation candidate position $x(0, i_0)$ ($i_0=1$ in FIG. 3) of the segmentation candidate section $k=0$ working as a leading end, the optimum mean value $\mu_d^*(0, 0; i_0, i_0)$ indicated in the formula (3-1) is calculated for $k=0$, and a square cumulative sum $D^*(0)$ of the optimum distance $d(-1, 0; i_{-1}, i_0)$ indicated in the formula (3-2) is calculated for $k=1$. An optimum segmentation candidate position $x(k, i_k)$ of the segmentation candidate section k in each segmentation candidate position $x(k+1, i_{k+1})$ of the next segmentation candidate section $(k+1)$ can be obtained by storing an optimum mean value $\mu_d^*(0, 1; i_k, i_0)$ and a square cumulative sum $D^*(k-1, k)$ of the optimum distance $d(k-1, k; i_{k-1}, i_k)$ at each segmentation candidate position $x(k, i_k)$ of the segmentation candidate section k. Here, the first term of the formula (3-3) represents another method for expressing the variance $\sigma_d^2(0, k+1; i_0, i_{k+1})$ shown in the formula (2).

Next, a calculating process of the formulas (3-1) and (3-3) is described referring to FIG. 3. In the drawing, $R(\mu, U)$ represents the mean value $\mu_d^*(0, 1; i_0, i_k)$ and the appreciation standard $U(0, k)$ shown in the recurrence formulas (3-1) and (3-3) in each segmentation candidate position $x(k, i_k)$ of each segmentation candidate section k (k=0, 1, 2, 3, 4). These are so calculated as optimum values from the segmentation candidate position $x^*(k-1, i_{k-1})$. Then, in this embodiment, the weighting factor $\beta$ in the formula (3-3) is specified at 0.5. Further, in FIG. 3, arrows indicate a sequence of the optimum segmentation candidate positions.

For example, the segmentation candidate position $x(2, 1)$ exists a position 39, and a distance $d(1, 2;, 1, 1)$ from the segmentation candidate position $x(1, 1)$ is 19. Accordingly, a mean value $\mu_d(0, 2)$ from the segmentation candidate position $x(0, 1)$ to the segmentation candidate position $x(2, 1)$ passing through the segmentation candidate position $x(1, 1)$ is $\frac{1}{2} \cdot (1 \cdot 20+19)=19.5$. $D^*(1)=20^2$ indicated in the formula (3-2) is stored correspondingly to the segmentation candidate position $x(1, 1)$. Therefore, $D(2)=20^2+19^2$ according to the expression (3-2). Now, substituting these values in the formula (3-3), the appreciation standard $U(0, 2)$ at the segmentation candidate position $x(2, 1)$ in a path through the segmentation candidate candidate position $x(1, 1)$ is $$U(0, 2) = 0.5 \left( \frac{20^2 + 19^2}{2} - 19.5^2 \right) + 0.5 \cdot (19.5 - 20)^2 = 0.38.$$

Similarly, an appreciation standard $U'(0, 2)$ at the segmentation candidate position $x(2, 1)$ in a path through the segmentation candidate position $x(1, 2)$, is 1.26. The start point of the path toward the segmentation candidate position $x(2, 1)$, namely the segmentation candidate positions $x(1, 1)$ or $x(1, 2)$ is selected such that the appreciation standards U takes a minimum value. Accordingly, an optimum segmentation candidate position of the segmentation candidate section k=1 toward the segmentation candidate position $x(2, 1)$ is $x(1, 1)$ because $U(0, 2)$ is smaller than $U'(0, 2)$. Further, the mean value $\mu_d^*(0, 2)=19.5$ and the appreciation standard $U(0, 2)=0.38$ are selected. Thus, an appreciation standard $U(0, k)$ (k=0, 1, 2, 3, 4) at each segmentation candidate position $x(k, i_k)$ (k=0, 1, 2, 3, 4) will be calculated, as shown in FIG. 3, by carrying out the similar operation according to the recurrence formulas (3-1), (3-2) and (3-3).

As described previously, the trailing end section E includes the segmentation candidate positions $x(4, 2)$, $x(4, 3)$ and $x(4, 4)$ of the segmentation candidate section k=4. One of the segmentation candidate positions $x(4, 2)$, $x(4, 3)$ and $x(4, 4)$ whose appreciation standard $U(0, 4)$ is minimum is selected as an end position of the character segmentation. Accordingly, the position $x(4, 2)$ is selected as the end position because its appreciation standard is 20.3 while others are 20.5 and 20.8.

Finally, $x(4, 2)=81$, $x(3, 3)=60$, $x(2, 2)=40$, $x(1, 1)=20$, $x(0, 1)=0$ are selected as segmenting positions by tracing the path of optimum segmentation candidate positions reversely from the character segmentation end position $x(4, 2)$. Namely, positions 0, 20, 40, 60 and 81 are determined as sectioning positions.

Figure 4:
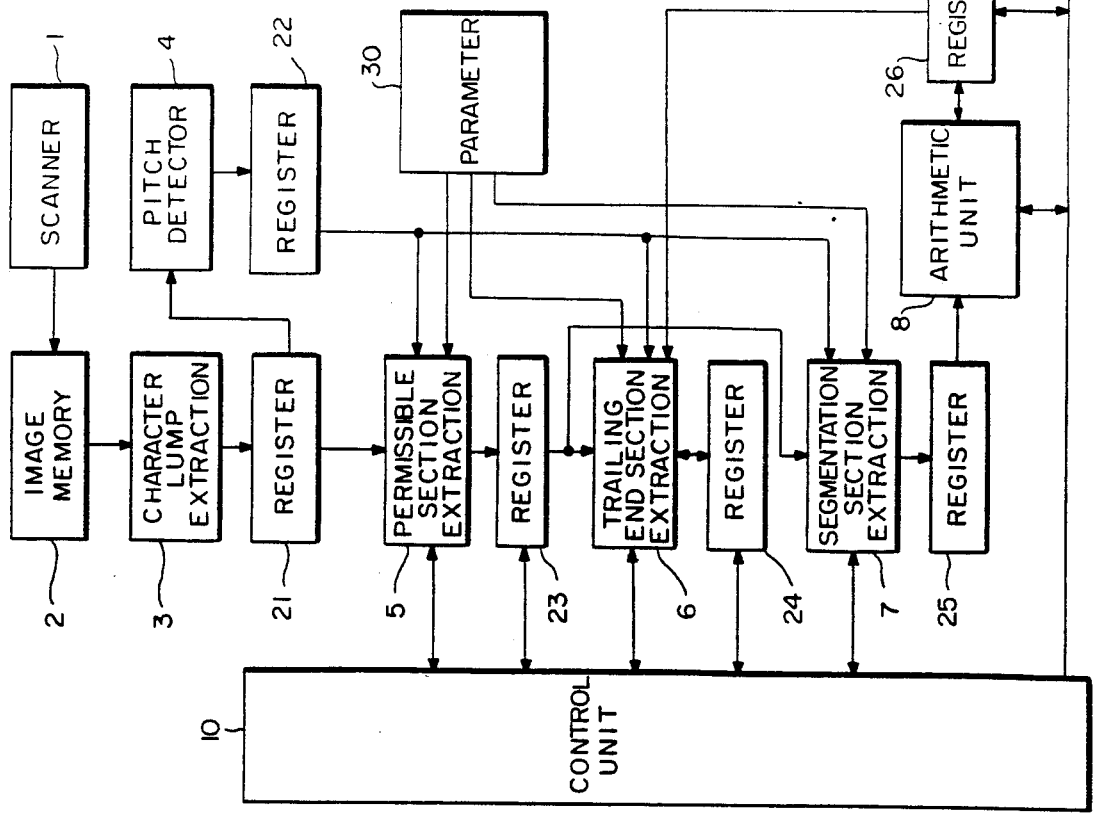
FIG. 4 is a block diagram of sectioning apparatus in accordance with an embodiment of the present invention.

A logical block for the above processing is shown in FIG. 4. A scanner 1 scans a character string image printed on a sheet of paper optically and transforms it into an electrical signal. The character string image is binary-quantized and stored in a character string image memory 2. A character lump extraction unit 3 extracts character lumps of the character string image out of the character string image memory 2 in sequence and stores position, width and height of each character lump Vi to a character lump information register 21. Such character lump extraction unit 3 can be realized according to a known technique. A character pitch detector 4 estimates the character pitch P by means of position, width and height of each character lump Vi stored in the character lump information register 21. The estimated character pitch is stored in a character pitch information register 22. The character pitch detector 4 will be described in detail hereinafter. Here if, the character pitch P is already known, the known character pitch P may be used. A parameter information register 30 stored parameters $T_1$, $T_2$, $T_3$, $T_4$, $T_5$, $\beta$ which are various thresholds and weighting factor as described previously.

A permissible section extraction unit 5 extracts the permissible sections Ai satisfying the above-described condition (1) and condition (2). The positions and height of the section Wi are extracted by a comparator or other circuit elements referring to the position and width Vi of a plurality of character lumps stored in the character lump information register 21. Next, each character lump width Vi is compared with the sum $P+T_1$ of the character pitch P stored in the character pitch information register 22 and the parameter $T_1$ stored in the parameter information register 30. If the width Vi is larger than the sum $P+T_1$, a value $T_2$ stored in the parameter information register 30 is truncated from both ends of the character lump width Vi, and the permissible section satisfying the condition (2) is extracted. The position and width of the permissible sections Ai are stored in a permissible section information register 23.

A trailing end candidate section extraction unit 6 calculates the product $T_4 \cdot P$ of the parameter $T_4$ stored in the parameter information register 30 and the character pitch P. Then, the unit 6 compares the product $T_4 \cdot P$ with the blank space Wi stored in the permissible section register 23. The blank space $W_j$ having a width larger than the product $T_4 \cdot P$ is thus detected as a first trailing end candidate section. Next, the extraction unit 6 calculates the product $T_5 \cdot P$ of the parameter $T_5$ and the character pitch P, and sets the section from a leading end of the blank space $W_j$ to the position determined by the product $T_5 \cdot P$ as a permissible section. Further, the sum $P+T_1$ of the character pitch P and the parameter $T_1$ is calculated, and the permissible section from a leading end of the character lump $V_j$ immediately before the bank space $W_j$ to the sum $P+T_1$ is set. The logical sum of the two permissible sections is calculated and stored in sequence in a trailing end candidate section register 24 as a second trailing end candidate section.

A segmentation candidate section extraction unit 7 extracts each segmentation candidate position $x(k, i_k)$ of the segmentation candidate section k in sequence with reference to the permissible sections Ai and parameters stored in the permissible section information register 23 and the parameter information register 30 respectively. At this time, a control unit 10 has obtained each segmentation candidate position $x(0, i_0)$ ($i_0 = 1, 2, \ldots h_0$) of the leading end segmentation candidate section $k = 0$ including a character segmentation start position. These positions $x(0, i_0)$ are calculated based on each segmentation candidate position in a constant range of blank space $W_0'$. The blank space $W_0'$ is set according to the character pitch P from a leading end of the character string image. The segmentation candidate positions $x(0, i_0)$ are stored in an optimum segmentation position information register 26. A segmentation candidate section extraction unit 7 calculates a segmentation candidate position $x(k+1, i_{k+1})$ satisfying the expression (1). In this calculation, the segmentation candidate positions $x(k, i_k)$ ($i_k = 1, 2, \ldots h_k$) of the segmentation candidate section k ($k = 0, 1, 2, \ldots$) are read from the optimum segmentation candidate position register 26. That is, a position $(x(k, 1) + P - T_3)$ is calculated using the first segmentation candidate position $x(k, 1)$ of the segmentation candidate section k, the character pitch P and the parameter $T_3$. Next, a position $(x(k, h_k) + P + T_3)$ is calculated using the last segmentation candidate position $x(k, h_k)$ of the segmentation candidate section k, the character pitch P and the parameter $T_3$. The scan bits included in a section $k'$ from the position $(x(k, 1) + P - T_3)$ to $(x(k, h_k) + P + T_3)$ are subjected to a logical product with the permissible section Ai. All the segmentation candidate positions $x(k+1, i_{k+1})$ ($i_{k+1} = 1, 2, \ldots h_{k+1}$) of the segmentation candidate section $(k+1)$ are thus extracted and stored in a segmentation candidate position information register 25.

Contents of the segmentation candidate position information register 25 are transferred to an appreciation standard arithmetic operation unit 8. When the segmentation candidate positions $x(k+1, i_{k+1})$ are transferred to the arithmetic operation unit 8, the segmentation candidate positions $x(0, i_0)$ ($i_0 = 1, \ldots h_0$), $x(1, i_1)$ ($i_1 = 1, \ldots h_1$), $\ldots x(k, i_k)$ ($i_k = 1, \ldots h_k$) which belong to the segmentation candidate section $k = 0$ to k have already been computed and are stored in the optimum segmentation position information register 26. Further, the mean value $\mu_d^*(0, k; i_0, i_k)$ calculated by the appreciation standard arithmetic operation unit 8 according to the formula (3-1), the square cumulative sum $D^*(k)$ of a distance calculated according to the formula (3-2), and the appreciation standard $U(0, k)$ and the optimum segmentation candidate position $x^*(k-1, i_{k-1})$ of the segmentation candidate section $k-1$ calculated according to the formula (3-3) have already been stored in the register 26. These data are stored in the area correspondingly to each segmentation candidate position $x(k, i_k)$ ($i_k = 1, \ldots h_k$). Then, when the segmentation candidate positions $x(0, i_0)$ of the segmentation candidate section $k = 0$ are stored in the register 25, 0 is loaded therein as the mean value $\mu_d^*(0, 0; i_0, i_0)$ and the square cumulative sum $D^*(0)$ corresponding to each segmentation candidate position $x(0, i_0)$.

When the segmentation candidate position $x(k+1, i_{k+1}^*)$ are transferred from the segmentation candidate position information register 25, the appreciation standard arithmetic operation unit 8 calculates the distance $d(k, k+1; i_k, i_{k+1}^*)$ for each segmentation candidate position $x(k, i_k)$ ($i_k = 1, 2, \ldots h_k$) of the segmentation candidate section k. Next, $h_k$ values of the appreciation standard $U(0, k+1)$ relating to the segmentation candidate positions $x(k, i_k)$ of the segmentation candidate section k are obtained through calculating the recurrence formulas (3-1), (3-2) and (3-3) in sequence, using the mean value $\mu_d^*(0, 1; i_0, i_k)$, square cumulative sum $D^*(k)$ of the distance, and parameter $\beta$ stored in the parameter information register 30.

Then, the minimum value of the appreciation standard $U^*(0, k+1)$ is detected, and the segmentation candidate position $x^*(k, i_k)$ corresponding to the minimum standard $U^*(0, k+1)$ is selected as an optimum segmentation candidate position. The optimum segmentation candidate $x^*(k, i_k)$ is a precedent point leading to the determination of the segmentation candidate position $x(k+1, i_{k+1}^*)$. Further, the minimum value of the appreciation standard $U(0, k+1)$, the mean value $\mu_d^*(0, k+1, i_0, i_{k+1}^*)$ corresponding to the minimum appreciation standard $U(0, k+1)$, and the square cumulative sum $D^*(k+1)$ of the distance are stored in the optimum segmentation position information register 26 together with the segmentation candidate position $x(k+1, i_{k+1})$. The appreciation standard arithmetic operation unit 8 performs the above-described operation for all the segmentation candidate positions $x(k+1, i_{k+1})$.

Next, the control unit 10 instructs the segmentation candidate section extraction unit 6 for extraction of the segmentation candidate positions $x(k+2, i_{k+2})$ of the next segmentation candidate section $k+2$. Thus, the same operation as described above is repeated.

The control unit 10 then checks whether or not the segmentation candidate position $x(k+1, i_{k+1})$ of the segmentation candidate section $(k+1)$ transferred to the optimum segmentation position information register 26 has reached the trailing end candidate section. The information of the trailing end candidate section is stored in the trailing end candidate section register 24. If not, then only an instruction on processing to the next segmentation candidate section is output to the segmentation candidate section extraction unit 6. On the other hand, if the segmentation candidate position $x(k+1, i_{k+1})$ has reached the trailing end candidate section, the control part 10 outputs the above instruction to the segmentation candidate section extraction part 6, and insures that each segmentation candidate position $x(k+2, i_{k+2})$ ($i_{k+2} = 1, \ldots h_{k+2}$) of the next segmentation candidate section $k+2$ is appreciated by the appreciation standard arithmetic operation unit 8.

Next, the control unit 10 detects the segmentation candidate positions $x(e, i_e)$ included in the trailing end candidate section E. Then, the control unit 10 calculates a plurality of the appreciation standard $U(0, n)$ relating to $h_e$ value of the segmentation candidate positions $x(e, i_e)$. The minimum appreciation standard $U^*(0, n)$ is detected, and the segmentation candidate position $x^*(e, i_e)$ corresponding to the appreciation standard $U^*(0, n)$ is selected as a trailing end position.

The control unit 10 further detects a sequence of optimum segmentation candidate positions reaching the segmentation candidate position $x^*(n, i_n)$. This detection is carried out referring to the optimum segmentation position information register 26. That is, the sequence of the optimum segmenting position is selected by tracing the optimum path reversely from the trailing end position $x^*(n, i_n)$ to the segmentation candidate positions $x^*(n-1, i_{n-1}), \ldots x^*(0, i_0)$ in sequence. The segmenting positions thus detected, are stored in a character segmenting position register 27.

Next, the control unit 10 detects a constant range set according to the character pitch P within the blank space from the trailing end position $x^*(n, i_n)$ to a leading end of the next character lump. This constant range is set as a leading end of the fragmentary character string image to be segmented next. The position of the leading end is stored to the optimum segmenting position information register 26.

Thus, character segmenting positions of the character string image (FIG. 1 (a)) are stored to the character segmenting position register 27. The character string image is segmented into characters by means of the height of each character lump stored in the character lump information register 21 and the character segmenting position stored in the character segmenting position register 27. Segmented characters are read by a known character recognition system.

The appreciation standard arithmetic operation unit 8 will now be described in detail with reference to FIG. 5. When the segmentation candidate positions $x(k+1, i_{k+1})$ of the segmentation candidate section $k+1$ are stored in the segmentation candidate position information register 25, the segmentation candidate positions $x(k+1, i_{k+1})$ are transferred to a distance calculation unit 81 and a segmentation candidate position group register 261 at appropriate positions. The segmentation candidate section $(k+1)$ is stored in a stage register 80 and the segmentation candidate position group register 261 at predetermined positions. When the segmentation candidate positions $x(k+1, i_{k+1})$ are stored in the distance calculation part 81, the segmentation candidate positions $x(k, i_k)$ stored in the segmentation candidate position group register 261 are transferred by the control unit 10 in sequence to the distance calculation unit 81. The optimum segmentation position information register 26 comprises the segmentation candidate position group register 261, a concatenation information group register 262, an optimum statistic group register 263 and an optimum appreciated value group register 264. The distance calculation unit 8 calculates a distance $d(k, k+1; i_k, i_{k+1})$ in sequence.

A statistic calculation unit 82 calculates a mean value $\mu_d(0, k+1; i_0, i_{k+1})$ and a square cumulative sum $D(k)$ of the distance according to the recurrence formulas (3-1) and (3-2). That is, the mean value $\mu_d(0, k+1; i_0, i_{k+1})$ is calculated according to the expression (3-1) by means of the mean value $\mu_d^*(0, k; i_0, i_k)$ at the segmentation candidate position $x(k, i_k)$ stored in the optimum statistic group register 263, the distance $d(k, k+1; i_k, i_{k+1})$ calculated in the distance calculation unit 81, and segmentation sections $(k+1)$ and k stored in the stage register 80. On the other hand, the square cumulative sum $D(k+1)$ of the distance is calculated according to the formula (3-2) by means of the square cumulative sum $D^*(k)$ of the distance at the segmentation candidate position $x(k, i_k)$ stored in the optimum statistic group register 263 and the distance $d(k, k+1; i_k, i_{k+1})$ put out from the distance calculation part 81. The mean value $\mu_d(0, k+1; i_0, i_{k+1})$ and the square cumulative sum $D(k+1)$ of the distance are calculated by the statistic calculation unit 82. These data are stored in a statistic loading register 83. An appreciated value calculation unit 84 calculates a value of the appreciation standard $U(0, k+1)$ according to the formula (3-2). That is, the appreciated value $U(0, k+1)$ is calculated according to the formula (3-3) by means of the character pitch P, the parameter $\beta$, the contents of the statistic loading register 83, and the contents of the stage register 80.

Next, a comparator 85 compares an appreciated value put out from the appreciated value calculation unit 84 with the contents of a minimum appreciated value register 86. If the output of the appreciated value calculation unit 84 is smaller than the content of the minimum appreciated value register 86, an output signal 851 turns "ON". Initially, a sufficiently large value is set in the minimum appreciated value register 86.

When the output signal 851 turns "ON", a gate circuit 53 opens, and an output of the appreciated value calculation part 84 is transferred to the minimum appreciated value register 86. Further, when the output signal 851 turns "ON", a gate circuit 52 opens, and the mean value $\mu_d(0, k+1, i_0, i_{k+1})$ and the square cumulative sum $D(k+1)$ of the distance stored in the statistic loading register 83 are transferred to a minimum statistic register 88. Furthermore, when the output signal 851 turns "ON", a gate circuit 51 opens, position information k and $i_k$ at the segmentation candidate position $x(k, i_k)$ stored in the distance calculation part 81 are transferred to a concatenation information register 87.

The above operation is applied to all segmentation candidate positions $x(k, i_k)$ $(i_k=1, \ldots h_k)$ of the segmentation candidate section k stored in the optimum segmentation position information register 261.

That is, at this time, the optimum mean value $\mu^*(0, k+1; i_0, i_{k+1})$ and the square cumultive sum $D^*(k+1)$ at the segmentation candidate position $x(k+1, i_{k+1})$ are stored in the minimum statistic register 88. An optimum appreciated value of the segmentation candidate position $x(k+1, i_{k+1})$ is stored in the minimum appreciated value register 86. Further, an optimum segmentation path information to the segmentation candidate position $x(k+1, i_k)$ from the segmentation candidate section $x(k, i_1)$ is stored in the concatenation information register 87. Contents of the minimum statistic register 88, the minimum appreciated value register 86 and the concatenation information register 87 are respectively transferred to the minimum statistic group register 263, the minimum appreciated value group register 264 and the concatenation information group register 262 by the control part 10. Next, the minimum appreciated value register 86 is initialized to a sufficiently large valve.

The optimum appreciated value and the optimum segmentation path relating to all the segmentation candidate positions $x(k+1, k_{k+1})$ $(i_{k+1}=1, 2, \ldots, h_{k+1})$ of the segmentation candidate section $(k+1)$ are obtained by repeating the above operation. These operations can be realized by a normal microcomputer.

The character sectioning apparatus as described above can section a character string into individual characters easily and stably even if the character string includes touching characters and one character is split into two or more images.

Next, the character pitch detector 4 will be described in detail.

Figure 6:
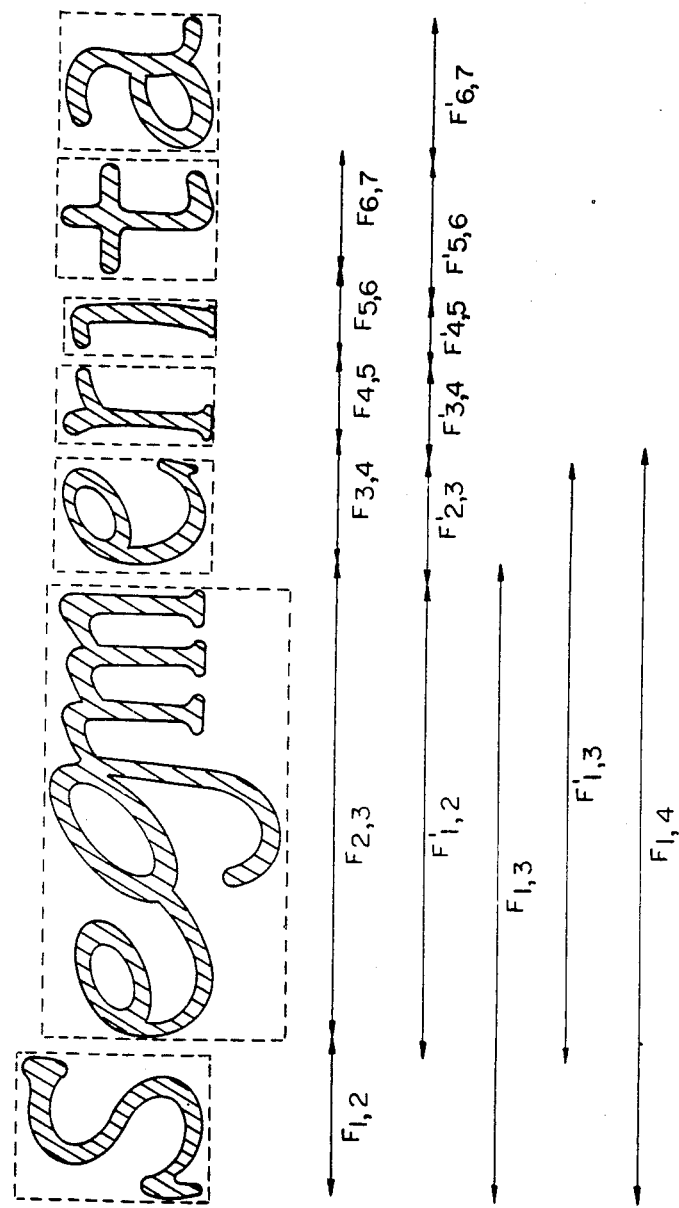
FIG. 6 illustrates a distance between character lumps set on the character string image.

FIG. 6 represents a character string image for describing a distance between character lumps. The character lump is indicated by oblique lines and is given in a rectangular area (broken line). A reference symbol $F_{i, i+1}$ (i = 1, 2, ... 6) represents a distance from a leading end of the i-th character lump to a leading end of the $i+1$-th character lump. A reference symbol $F'_{i, i+1}$ (i = 1, 2, ... 6) represents a distance from a trailing end of the i-th character lump to a trailing end of the $i+1$-th character lump. The symbols representing a distance between the character lumps can be utilized as observed values constituting a frequency distribution of a distance between the character lumps. Similarly, a reference symbol $F'_i, j$ $(i = 1, 2, \ldots 6; i<j)$ represents a distance from a leading end of the i-th character lump to a leading end of the j-th character lump, and a reference symbol $F'_{i,j}$ represents a distance from a trailing end of the i-th character lump to a trailing end of the j-th character lump. As more observations are made, more stable statistics will be obtained, and hence these can be utilized as observed values constituting a frequency distribution of the distance between character lumps described hereinafter.

The distance between character lumps for the observed value constituting the frequency distribution can be limited as far as the distance $F_{i,j}$ $(j=i+1, i+2, i+3)$ or the distance $F'_{i,j}$ $(j=i+1, i+2, i+3)$. Further, character images such as period (.), comma (,) and the like can be removed from observation of the distance between character lumps by checking the character lump width and height by means, for example, of a mean height $H_m$ of a plurality of character lumps. When a large blank space as compared with the mean height $H_m$ is detected, the distance between character lumps including the blank space can be removed from the observation.

Figure 7:
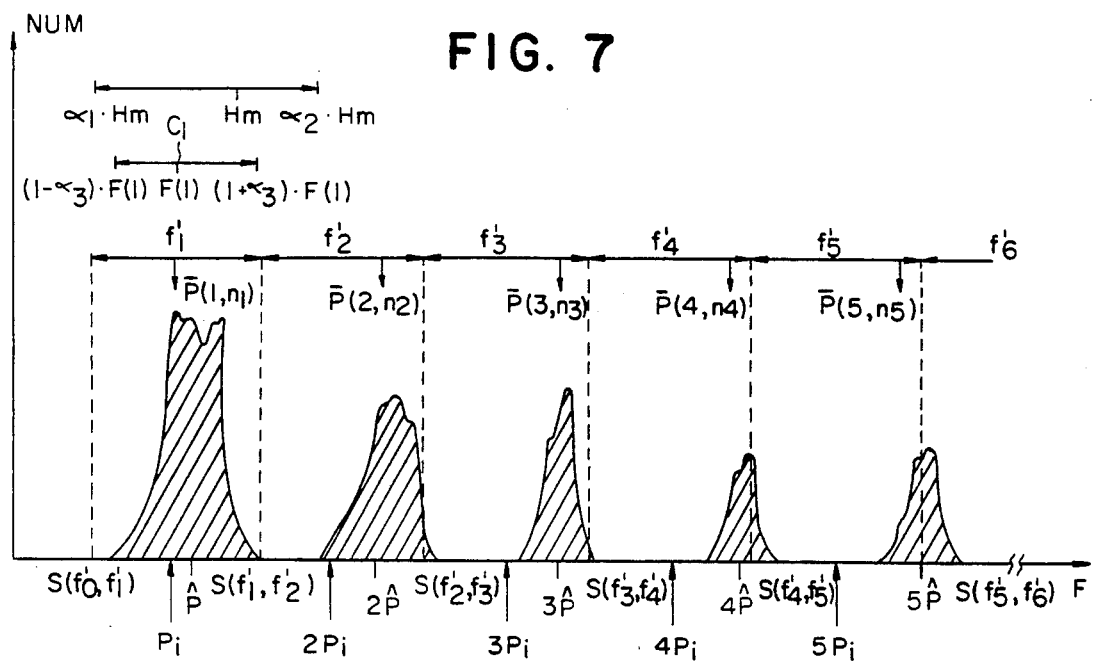
FIG. 7 illustrates one example of a frequency distribution of the distance between character lumps obtained from a series of character string image.

Referring to FIG. 7, which is one example of a frequency distribution of the distance between a series of character lumps having a constant pitch character as shown in FIG. 6. An axis F of abscissas indicates a value of the distance $F_{i,j}$, and an axis NUM of ordinates indicates a frequency of the distance between character lumps.

FIGS. 8 (a) and 8 (b) represent an example of a frequency distribution of the distance between a series of character lumps in a constant pitch data and an alphabetical variable pitch data, respectively.

Figure 8A:
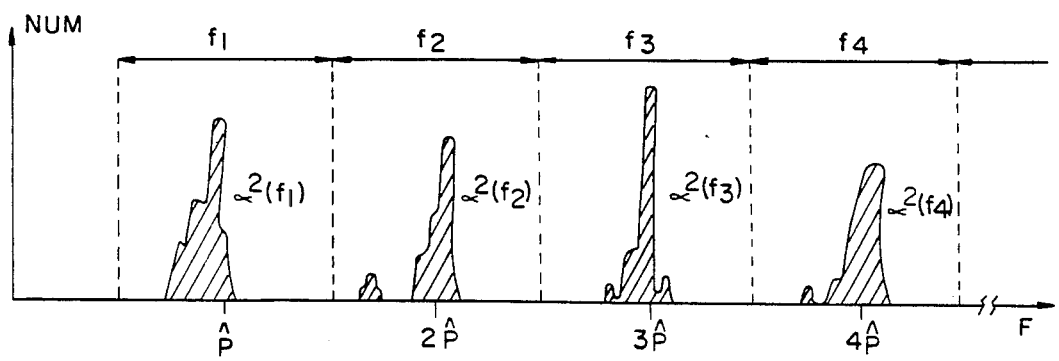
FIGS. 8 (a) and 8 (b) illustrate one example of a frequency distribution of the distance between character lumps having a constant character pitch and a variable character pitch, respectively.
Figure 8B:
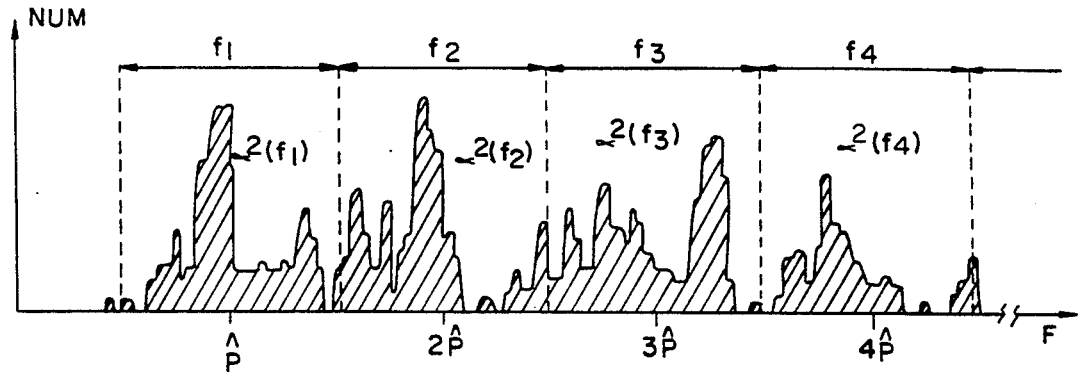

A principle of detecting character pitch will be now described. With reference to FIGS. 7 and FIGS. 8(a) and 8(b), the mean character height $H_m$ is calculated according to the heights of a plurality of character lumps. Next, a presence candidate section $(\alpha_1 \cdot H_m, \alpha_2 \cdot H_m)$ of the character pitch is set by means of coefficients 1 and $\alpha_2$ $(\alpha_1 < \alpha_2)$. All distances between the character lumps existing in the presence candidate section $(\alpha_1 \cdot H_m, \alpha_2 \cdot H_m)$ can be regarded as candidate character pitches $P_i$, however, the number of the candidate character pitches $P_i$ can be reduced according to the following processing in order to save processing time. That is, a distance $F(1)$ between character lumps which takes the most frequent distance within a constant permissible width $\Delta \tau$ is calculated by means of the frequency distribution within the presence candidate section $(\alpha_1 \cdot H_m, \alpha_2 \cdot H_m)$. A lower bound value of a limited presence candidate section of the character pitch $P_i$ is set as $MAX(\alpha_1 \cdot H_m, (1-\alpha_3) \cdot F(1))$ by means of a coefficient $\alpha_3$ $(0 \leq \alpha_3 \leq 1)$. An upper bound value of the limited presence candidate section of the character pitch is set as $MIN(\alpha_2 \cdot H_m, (1+\alpha_3) \cdot U(1))$. In FIG. 7, a section $C_1$ is the limited presence candidate section of the character pitch, and a plurality of distance measurements between character lumps included in the section $C_1$ are the candidate character pitches $P_i$.

Next, the frequency distribution is divided into areas $f'_1, f'_2, \ldots f'_n$ as indicated by a broken line. Here, a boundary point $S(f'_{k-1}, f'_k)$ of each area $f'_k$ $(k=1, 2, \ldots n)$ is present at the middle of a center $(k-1) \cdot P_i$ of the area $f'_{k-1}$ and a center $k \cdot P_i$ of the area $f'_k$. Similarly, a boundary point $S(f'_k, f'_{k+1})$ of each area $f'_k$ is present at middle of a center $k \cdot P_i$ of the area $f'_k$ and a center $(k+1) \cdot P_i$ of the area $f'_{k+1}$. Accordingly, the boundary point $S(f'_{k-1}, f'_k)$ is expressed as $(kP_i - \frac{1}{2}P_i)$ and the boundary point $S(f'_k, f'_{k+1})$ is expressed as $(kP_i + \frac{1}{2}P_i)$. Next, a mean value $\bar{P}(k, n_k)$ of $n_k$ valves $(n_k \geq 0)$ of distance measurements between character lumps present in the area $f'_k$ $(k=1, 2, \ldots n)$ is calculated. A quantity corresponding to the character pitch observed from the area $f'_k$ based on the candidate character pitch $P_i$ is detected by dividing the mean value $\bar{P}(k, n_k)$ by an integer k.

An estimated character pitch $\hat{P}$ can be obtained by means of an optimal linear estimating technique. In this technique, a plurality of differences between a value $1/k \cdot P(k \cdot n_k)$ observed from the area $f'_k$ and the candidate character pitch $P_i$ covering the area $f'_k$ are calculated. Then, the candidate character pitch $P_i$ minimizing the difference is selected as an estimated character pitch $\hat{P}$.

Accordingly, the following estimation error appreciation standard (various criterion) T which works as the appreciation standard for optimal estimation is employed.

$$T = \sum_{k=1}^{n} C(k, n_k) \cdot \left( \frac{1}{k} \cdot P(k, n_k) - P_i \right)^2 \cdot \frac{1}{P_i^2} \quad (4)$$

where the coefficient $C(k, n_k)$ is a function of a sample number $n_k$ and an integer k $(k = 1, 2, \ldots n)$, and which satisfies $$\sum_{k=1}^{n} C(k, n_k) = 1.$$

As an example of this coefficient, $$C(k, n_k) = k^2 n_k / \sum_{k=1}^{n} k^2 \cdot n_k$$

can be used. Further, the estimation error appreciation standard T of the formula (4) is a variance of estimation error. However, an appreciation standard based on an absolute value $|1/K \cdot \bar{P}(k, n_k) - P_i|$ of the difference may be employed. The optimum estimated character pitch $\hat{P}$ can be obtained by means of formula (4). Further, the frequency distribution of the distance between character lumps is also clustered at the same time.

Next, a character pitch identifying technique will be described with reference to FIGS. 7, 8(a) and 8(b). The frequency distribution of the distance between character lumps having a constant pitch printed character (FIG. 8 (a)) is different from that having a variable pitch printed character (FIG. 8 (b)). The difference can be identified by appreciating a plurality of variances $\sigma^2(f_k)$ of the distance between character lumps on k times $(\hat{P}, 2\hat{P}, 3\hat{P}, \ldots)$ of the estimated character pitch $\hat{P}$ for all the area $f_k$ $(k=1, 2, \ldots n)$. The following variance appreciated value $\epsilon^2$ constituted of the linear sum of a variance $\sigma^2(f_k)$ for all the area $f_k$ $(k=1, 2, \ldots n)$ will be employed:

$$\epsilon^2 = \frac{1}{\hat{P}^2} \cdot \sum_{k=1}^{n} C'(k, n_k) \cdot \sigma^2(f_k) \quad (5)$$

where the coefficient $C'(k, n_k)$ at the variance appreciated value $\epsilon^2$ is a function of the sample number $n_k$ of the distance between character lumps and the integer k, and which satisfies $$\sum_{k=1}^{n} C'(k, n_k) = 1.$$

As an example of this coefficient, $$C'(k, n_k) = k^2 \cdot n_k / \sum_{k=1}^{n} k^2 \cdot n_k$$

can be employed. Here, an error appreciated value $\epsilon$ can be used instead of the above-described variance appreciated value $\epsilon^2$.

If the variance appreciated value $\epsilon^2$ or the error appreciated value $\epsilon$ is greater than a preset threshold $\alpha_4$, the character string can be segmented by means of the estimated character pitch $\hat{P}$ as a main component, namely, the character string has a constant character pitch. If the variance appreciated value $\epsilon^2$ or the error appreciated value $\epsilon$ is less than the threshold $\alpha^4$, the character string cannot be segmented primarily by means of mainly the estimated character pitch $\hat{P}$, namely, the character string has a variable character pitch.

Thus, a property of the character pitch can be identified. A stable character segmentation will be ensured by the character sectioning apparatus shown in FIG. 4, in the case that the character string has a constant character pitch. On the other hand, if the character string has a variable character pitch, the characters can be segmented according to other character segmentation techniques based on a blank space of the character line image, for example.

Figure 9:
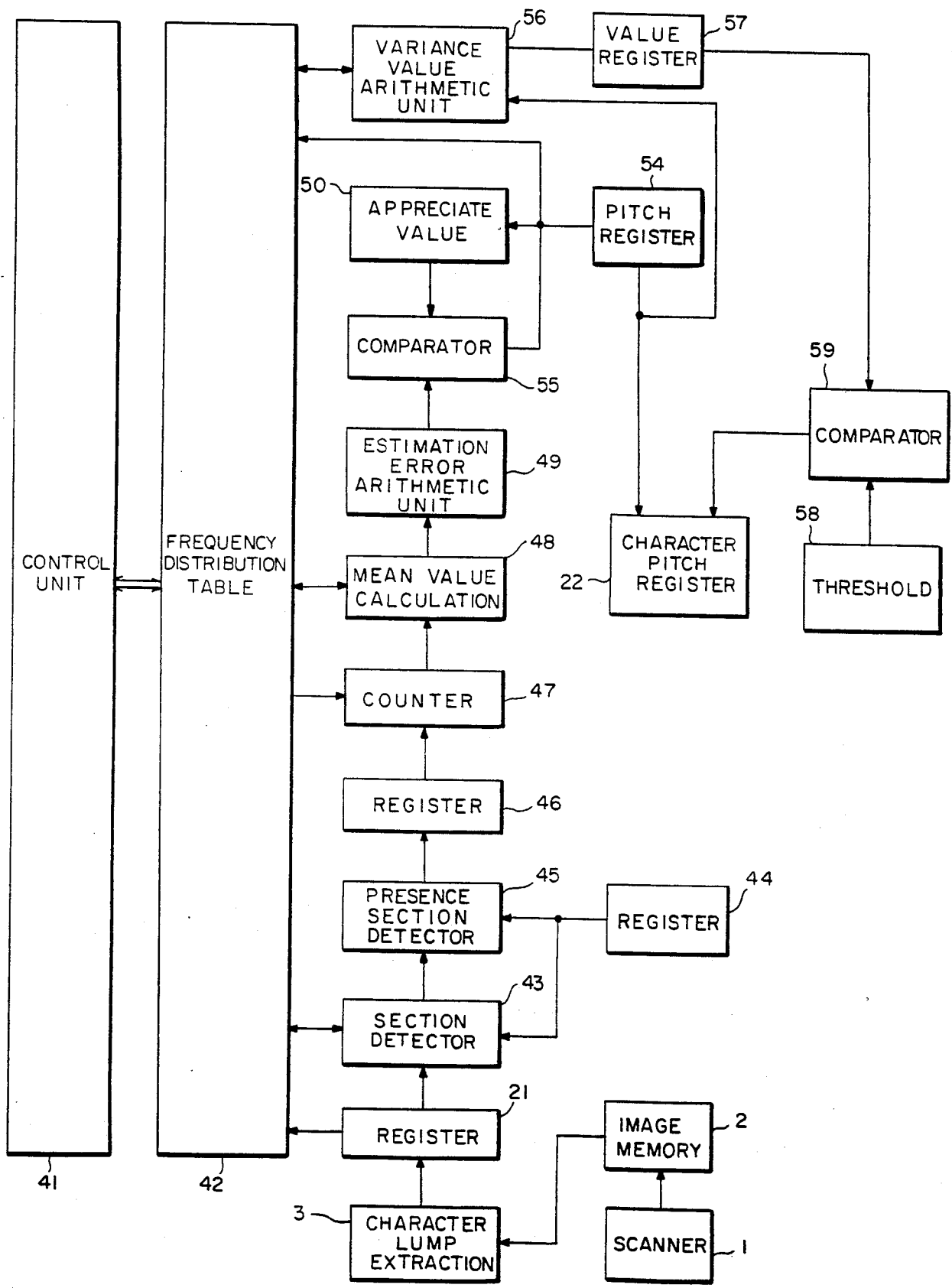
FIG. 9 is a block diagram of the character pitch detection unit shown in FIG. 4.

FIG. 9 is a block diagram of a character pitch detector. A leading edge position and a size of each character lump are stored in the character lump register 21 from the scanner 1, the character string image memory 2 and the character lump extraction unit 3. The size of the character lump is defined as the width and the height of the character lump. An another control unit 41 calculates a distance between character lumps by means of a leading end position and a trailing end position of the character lumps. The leading and trailing end positions are transferred in sequence from the character lump register 21. Then, the control unit 41 increases a frequency corresponding the distance between character lumps. The frequency is stored in a frequency distribution table 42 at an address position indicating the distance between character lumps. Thus, the frequency distributions of the distance between character lumps as shown in FIGS. 7, 8(a) and 8(b) are generated in the frequency distribution table 42. Initially, the frequency distribution table 42 is initialized to 0.

Next, the control unit 41 calculates the mean height $H_m$ by means of a plurality of height measurements of a plurality of character lumps stored in the character lump register 21. The mean height $H_m$ is transferred to a presence section detector 43. A constant register 44 stores the coefficients $\alpha_1$, $\alpha_2$ ($\alpha_1 < \alpha_2$) and $\alpha_3$ and the constant permissible width $\Delta\tau$. The presence section detector 43 inputs the coefficients $\alpha_1$ and $\alpha_2$ from the constant register 44 at first, and then sets the lower bound value $\alpha_1 \cdot H_m$ and the upper bound value $\alpha_2 \cdot H_m$ of a presence candidate section of the character pitch. Next, the presence section detector 43 reads a frequency value of the distance between character lumps belonging to the presence candidate section in sequence from the frequency distribution table 42 via the control unit 41. According to this frequency value, the distance $F(1)$ between character lumps which takes the most frequent distance within the constant permissible width $\Delta\tau$ is calculated.

A presence section arithmetic operation unit 45 calculates values $(1-\alpha_3) \cdot F(1)$ and $(1+\alpha_3) \cdot F(1)$ by means of the distance $F(1)$ by means of the presence section detector 43 and the coefficient $\alpha_3$ from the constant register 44. Then, the arithmetic operation unit decides MAX$\{\alpha_1 \cdot H_m, (1-\alpha_3) \cdot F(1)\}$ and MIN $\{\alpha_2 \cdot H_m, (1+\alpha_3) F(1)\}$ as a lower bound value $P_L$ of the character pitch limited presence candidate section $C_1$ and an upper bound value $P_U$ of the limited presence candidate section $C_1$. The lower and upper bound values $P_L$ and $P_U$ are stored to a presence section register 46. If the distance $F(1)$ is not detected in the presence section detector 45, the mean height $H_m$ is set instead of the distance $F(1)$.

Then, the lower bound value $P_L$ of the character pitch is transferred from the presence section register 46 to a counter 47. The counter 47 is counted from the lower bound value $P_L$ up to the upper bound value $P_U$ in sequence after, the operation described below is finished, and transfers the count value $P_i$ ($P_L \leq P_i \leq P_U$) to a mean value calculation unit 48. The mean value calculation unit 48 calculates n pieces of area ranges of frequency distribution, namely, a lower bound value $(k \cdot P_i - \frac{1}{2} P_i)$ and an upper bound value $(k \cdot P_i + \frac{1}{2} P_i)$ for all the areas $f_k$ (k=1, 2, ... n) according to the count value (the candidate character pitch $P_i$) transferred from the counter 47. Further, the means value calculation unit 48 calculates a number $n_k$ and mean value $\bar{P}(k, n)$ of the distance between character lumps belonging to the area $f_k$ with reference to the frequency distribution table 42. The above processing is carried out covering n pieces of areas. The candidate character pitch $P_i$, the number nk (k=1, 2, ... n) of the distance between character lumps of each area $f_k$ (k=1, 2, ... n) and the mean value $\bar{P}$(k=1, 2, ... n) are transferred to an estimation error appreciated value arithmetic operation unit 49. The estimation error appreciated value arithmetic operation unit 49 computes the estimation error appreciated value T (formula (4)) by means of the information transferred from the mean value calculation unit 48.

A minimized estimation error appreciated value T is stored to an appreciated value register 50. Initially, a sufficiently large value is set in an optimum character pitch register 54 as the estimation error appreciated value. A comparison unit 55 compares the estimation error appreciated value T transferred from the estimation error appreciated value arithmetic operation unit 49 with a content of the appreciated value register 50. When an output value of the estimation error appreciated value arithmetic operation unit 49 is smaller than the content of the appreciated value register 50, the comparison unit 55 writes the output value of the estimation error appreciated value arithmetic operation unit 49 in the appreciated value register 50, and writes a value of the candidate character pitch $P_i$ in the optimum character pitch register 54. Then, the comparison unit 49 advances the counter 47 by 1 via the control unit 41. On the other hand, when the output value of the arithmetic operation unit 49 is larger than the content of the appreciated value register 50, the comparison part 55 only advances the counter 47 by 1. The optimum character pitch $\hat{P}$ will be obtained in the optimum character pitch register 54 by carrying out the above operation until a value of the counter 47 reaches the upper bound value $P_U$ of the character pitch.

When the optimum estimated character pitch $\hat{P}$ is set in the optimum character pitch register 50, a variance appreciated value arithmetic operation unit 56 calculates a range of n pieces of areas of the frequency distribution, namely, a lower bound value $(k \cdot \hat{P} - \frac{1}{2}\hat{P})$ and an upper bound value $(k \cdot P - \frac{1}{2}\hat{P})$ of the area $f_k$ ($k = 1, 2, \ldots n$) according to the estimated character pitch $\hat{P}$. Next, the variance appreciated value arithmetic operation unit 56 calculates a sample number $n_k$ and a variance $\sigma^2(f_k)$ at a value $k \cdot \hat{P}$ of the distance between character lumps belonging to the area $f_k$ with reference to the frequency distribution table 42. Further, the arithmetic operation unit 56 computes the variance appreciated value $\epsilon^2$ of formula (5). In this embodiment the variance $\sigma^2(f_k)$ is detected by the variance appreciated value arithmetic operation unit 56, but it can also be calculated at the mean value calculation unit 48. The variance appreciated value $\epsilon^2$ is stored to a variance appreciated value register 57.

A threshold register 58 stores a threshold $\alpha_4$ for identifying the character pitch. A comparator 59 identifies a property of the character pitch by comparing the variance appreciated value $\epsilon^2$ stored in the variance appreciated value register 57 with the threshold $\alpha_4$ stored in the threshold register 58. That is, if the variance appreciated value $\epsilon^2$ is smaller than the threshold $\alpha_4$, the comparator 59 decides that a method for determining the character segmenting position with the estimated character pitch $\hat{P}$ as a main component cannot be applied; if the variance appreciated value $\epsilon^2$ is larger than the threshold $\alpha_4$, the comparator 59 is decided that the method for determining the character segmenting position with the estimated character pitch $\hat{P}$ as a main component can be applied. In the latter case, the estimated character pitch $\hat{P}$ stored in the optimum character pitch register 54 and the variance appreciated value $\epsilon^2$ stored in the variance appreciated value register 57 are transferred to the character pitch information register 22. In the former case, a plurality of character lump images stored in the character lump register 21 are segmented according to another character segmenting method.

In the character pitch detector, a character pitch can be measured accurately even if the character string includes touching characters or splited characters. Further, a property of the character pitch can be grasped securely, thereby selecting a character segmenting method with high adaptability.

As described above, the present invention comprises means for setting a segmentation candidate section with referrence to a character string image by means of a character pitch and a threshold, means for calculating a distance between segmentation candidate positions within a segmentation candidate section, means for calculating an appreciation standard consisting of a variance of the calculated distance and a square error of a deviation between a mean value and the character pitch, and means for obtaining a sequence of the segmentation candidate position minimizing the appreciation standard to determine an optimum character segmenting position, thereby, segmenting the character string can be carried out easily and stably at every characters.

According to this invention, further, a frequency distribution on a distance between character lumps is created from a plurality of character images, the frequency distribution is divided into a plurality of areas by means of information such as character height and the like, an appreciation standard of estimation error between a representative point of the divided areas and a candidate character pitch is set, the candidate character pitch minimizing the appreciation standard is set as an estimated character pitch, thereby, a character pitch can accurately be obtained in spite of existing touching characters or a split character in the character string.

What is claimed is:

1. A character sectioning apparatus for segmenting character string images into individual characters by means of a projection distribution obtained through a series of character string images, comprising:
    a means for identifying a plurality of character lumps, separated by spaces, from said projection distribution;
    means for estimating a character pitch; means
    means responsive to said projection distribution and said character pitch for setting segmentation candidate sections comprising a plurality of segmentation candidate positions;
    means for calculating a distance measurement between each of said segmentation candidate positions within said segmentation candidate sections and segmentation candidate positions within an adjacent segmentation candidate section;
    means for calculating an appreciation standard as a function of said distance measurements for segmentation candidate positions in each of said plurality of segmentation candidate sections; and
    means for selecting an optimum segmentation candidate position for each of said plurality of segmentation candidate sections;
    wherein each optimum segmentation candidate position minimizes said appreciation standard for the respective segmentation candidate section.

2. The character sectioning apparatus as claimed in claim 1, wherein said segmentation candidate section is a logical product of said blank space and a section set as a function of said character pitch.

3. The character sectioning apparatus as claimed in claim 1, further comprising means for identifying a character lump which exceeds a first threshold and setting a segmentation candidate section defined by the logical sum of a first and second logical product, wherein:
    said first logical product is a product of the amount of said character lump exceeding said first threshold and a section set as a function of said character pitch;
    and said second logical product is a product of a blank space and a section set by said character pitch.

4. The apparatus of claim 3, wherein said character lump which exceeds a first threshold is truncated at a leading end and a trailing end by amount equal to a fifth threshold.

5. The apparatus of claim 4, wherein said fifth threshold is a function of said character pitch.

6. The character sectioning apparatus as claimed in claim 1, further comprising means for comparing the width of said blank spaces with a second threshold and for extracting a blank space having a width greater than said second threshold, wherein said extracted blank space is set as a first trailing end candidate section of said character string image.

7. The character sectioning apparatus of claim 6, further comprising:
means for extracting a first and a second section from said extracted blank space having a width greater than said second threshold;
wherein said first section extends from a leading end of said extracted blank space to a position determined as a function of said character pitch and a third threshold; and
wherein said second section extends from a leading end of a character lump preceding said extracted blank space to a position determined as a function of said character pitch and a fourth threshold; and
wherein a second trailing end section is defined as the logical sum of said first and second sections.

8. The apparatus of claim 1, wherein said appreciation standard is a function of a mean value of said distance measurements, a variance of said distance measurements, and said character pitch.

9. A character sectioning apparatus for segmenting character string images into individual characters by scanning a series of character string images, comprising:
means for detecting a plurality of character lumps from a series of character string images;
means for calculating a distance measurement between each of said character lumps and storing a frequency distribution of said distance measurements;
means for forecasting a presence section comprising a plurality of candidate character pitches;
means for dividing said frequency distribution into a plurality of areas;
means for detecting a candidate character pitch in said presence section, said candidate pitch minimizing an estimation error appreciation standard in a plurality of said areas, wherein said estimation error appreciation standard is a function of an optimum linear sum of estimation errors of the character pitch;
means for calculating a variance of said distance measurements and for calculating a variance appreciated value said variance appreciated value being a function of an optimum linear sum of a plurality of said variances; and
means for identifying the character pitch according to said variance appreciated value.

10. A character pitch detector for detecting a character pitch of a series of character string images, comprising:
means for detecting a plurality of character lumps from a series of said character string images;
means for calculating a distance measurement between said character lumps and for storing a frequency distribution of said distance measurements;
means for forecasting a presence section comprising candidate character pitches;
means for dividing said frequency distribution into a plurality of areas by means of an arbitrary candidate character pitch included in said presence section;
means for calculating a character pitch estimation error between a representative point of a plurality of said distance measurements in each of said areas and said arbitrary candidate character pitch;
means for calculating an estimation error appreciation standard as a function of an optimum linear sum of said character pitch estimation error in a plurality of said areas; and
means for calculating an optimum character pitch, wherein said optimum character pitch mimimizes said estimation error appreciation standard within a plurality of said arbitrary candidate character pitches.

11. A character pitch detecting method for detecting a character pitch of a series of character string images, comprising the steps of:
detecting a plurality of character lumps from a series of character string images;
calculating distance measurements between said character lumps;
storing a frequency distribution of said distance measurements;
forecasting a presence section comprising candidate character pitches;
dividing said frequency distribution into a plurality of areas by means of an arbitrary candidate character pitch contained in said presence section;
calculating a character pitch estimation error between a representative point of a plurality of said distance measurements in each of said areas and said arbitrary candidate character pitch;
calculating an estimation error appreciation standard as a function of an optimum linear sum of said character pitch estimation errors in a plurality of said areas; and
calculating an optimum character pitch wherein said optimum character pitch minimizes said estimation error appreciation standard within a plurality of said arbitrary candidate character pitches.

12. A method of segmenting a character string image into individual characters comprising the steps of:
(a) identifying character lumps and blank spaces within said character string;
(b) estimating a character pitch;
(c) defining segmentation candidate sections comprising segmentation candidate positions based on said character pitch;
(d) measuring a distance between each segmentation candidate position within a first segmentation candidate section and a segmentation candidate position within a second segmentation candidate section adjacent to said first segmentation candidate section;
(e) calculating an appreciation standard as a function of said distance measurements for a segmentation candidate position in each segmentation candidate section;
(f) selecting an optimum segmentation candidate position for each segmentation candidate section, wherein said optimum segmentation candidate position minimizes said appreciation standard for the respective segmentation candidate section; and
(g) segmenting said character string image at said optimum segmentation candidate positions.

13. The method of claim 12, wherein the step of defining segmentation candidate sections comprises the steps of:
(h) defining a first section as a function of said character pitch;
(i) calculating a first logical product of said first section and a blank space;
(j) defining a segmentation candidate by said first logical product; and (k) repeating steps h-j over the length of the character string.

14. The method of claim 12, wherein the step of defining a segmentation candidate section comprises:
   (h) identifying character lumps which exceed a first threshold;
   (i) calculating a first logical product of a section set as a function of said character pitch and the amount of said character lump exceeding said first threshold;
   (j) calculating a second logical product of a blank space and a section set by said character pitch; and
   (k) setting a segmentation candidate section equal to a logical sum of said first and second logical products.

15. The method of claim 14, further comprising the step of:
   (j) truncating said character pumps which exceed a first threshold at a leading end and a trailing end by an amount equal to a fifth threshold.

16. The method of claim 12 further comprising the steps of:
   (h) identifying a first blank space which exceeds a second threshold;
   (i) setting said first blank space which exceeds said second threshold as a first trailing end candidate section of said character string.

17. The method of claim 16 further comprising the steps of:
   (j) calculating a third threshold as a function of said character pitch;
   (k) calculating a fourth threshold as a function of said character pitch;
   (l) defining a first trailing end permissible section extending from a leading end of said first blank space to said third threshold;
   (m) defining a second trailing end permissible section extending from a leading end of a character lump immediately preceding said first blank space to said fourth threshold;
   (n) calculating a logical sum of said first and second trailing end permissible sections; and
   (o) defining said logical sum as a second trailing end candidate section.

18. A method of segmenting character strings into individual characters comprising the steps of:
   (a) detecting a plurality of character lumps from a series of character string images;
   (b) calculating a distance measurement between each of said character lumps;
   (c) storing a frequency distribution of said distance meaurements;
   (d) forecasting a presence section comprising a plurality of candidate character pitches;
   (e) dividing said frequency distribution into a plurality of areas;
   (f) detecting a candidate character pitch in said presence section, wherein said candidate character pitch minimizes an estimation error appreciation standard in a plurality of said areas, said estimation error appreciation standard being a function of an optimum linear sum of estimation errors of the character pitch;
   (g) calculating a variance of said distance measurements;
   (h) calculating a variance appreciated value, said variance appreciated value comprising an optimum linear sum of a plurality of said variances;
   (i) identifying the character pitch according to said variance appreciated value; and
   (j) segmenting the character string as a function of the identified character pitch.

* * * * *